(12) United States Patent
Powell et al.

(10) Patent No.: US 11,265,494 B2
(45) Date of Patent: Mar. 1, 2022

(54) TWO LEVEL TX LOW CONTROL FOR SIMULTANEOUS IMPROVED NOISE AND DARK CURRENT

(71) Applicant: SHENZHEN GOODIX TECHNOLOGY CO., LTD., Shenzhen (CN)

(72) Inventors: Matthew Powell, San Diego, CA (US); Scott D Willingham, San Diego, CA (US); Xiaodong Wang, San Diego, CA (US); Chao Yang, San Diego, CA (US); Mohamed Elsayed, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 23 days.

(21) Appl. No.: 16/907,342

(22) Filed: Jun. 22, 2020

(65) Prior Publication Data

US 2021/0400219 A1    Dec. 23, 2021

(51) Int. Cl.
*H04N 5/369*    (2011.01)
*H04N 5/3745*    (2011.01)

(52) U.S. Cl.
CPC ....... *H04N 5/3698* (2013.01); *H04N 5/37457* (2013.01)

(58) Field of Classification Search
CPC .. H04N 5/37457; H04N 5/3698; H04N 5/369; H04N 5/374; H04N 5/376; H04N 5/3765; H04N 5/361
See application file for complete search history.

(56) References Cited

U.S. PATENT DOCUMENTS

| | | | | |
|---|---|---|---|---|
| 8,093,541 | B2 * | 1/2012 | Chen | H04N 5/3456 250/208.1 |
| 10,785,432 | B2 * | 9/2020 | Lim | H04N 5/3597 |
| 2012/0235021 | A1 * | 9/2012 | Kasai | H04N 5/3559 250/208.1 |
| 2018/0027194 | A1 * | 1/2018 | Yang | H04N 5/3741 348/243 |
| 2021/0067726 | A1 * | 3/2021 | Ashitani | H01L 27/14603 |

* cited by examiner

*Primary Examiner* — Albert H Cutler
(74) *Attorney, Agent, or Firm* — Kilpatrick Townsend & Stockton LLP (57) ABSTRACT

An image sensor includes a controller and a plurality of pixel clusters. Each of the pixel clusters includes a plurality of pixels coupled to a reset transistor, a floating diffusion node, a source follower, and a select transistor. Each pixel of a pixel cluster includes a photodiode, and a transfer transistor having a first terminal coupled to the photodiode, a second terminal coupled to the floating diffusion node, and a gate. The controller is configured to apply a transfer control signal to the gate of the transfer transistor in response to a pixel operation, the transfer control signal being one of a positive voltage level, a negative voltage level, and a ground voltage level.

11 Claims, 8 Drawing Sheets

TWO LEVEL TX LOW CONTROL FOR SIMULTANEOUS IMPROVED NOISE AND DARK CURRENT

TECHNICAL FIELD

The present invention relates to image sensor devices, and more particularly, to image sensors with reduced dark current and method of operating thereof.

BACKGROUND

Modern image sensors with high pixel count achieve very dense pixel configuration with shared pixel control lines and column parallel readout. Good image quality requires low readout noise from individual pixels, but even lower noise for noise that is correlated across a pixel row or column. This can be a challenging requirement to meet in a large image sensor array. Noise is most often caused by coupling to the pixel from a shared noise source during the pixel readout. One common source of this type of noise is shared pixel control signals. Control signals that are tied to ground during the pixel readout typically do not couple noise into the pixel. The control signal for an NMOS transistor controlling pixel reset is one such example, as this control signal returns to ground after the pixel is reset but before any ADC measurement of the pixel output signal is measured. The control signal which selects a pixel row for read out is an example of the other case since with an NMOS version of this pixel, the control voltage must be driven high and remain high during pixel output voltage measurement. The control signal which manages the pixel transfer gate is a different case. It is typically at a low voltage while the reset value of the pixel is being measured by ADC and also low while the output value of the pixel is being measured. However, the low voltage the TX control signal is driven to is frequently below 0V due to considerations of pixel performance. This lower voltage is not tied to ground and must be generated through on chip circuitry in a very low noise manner to avoid creating a large shared noise source that is coupled unfavorably to the pixel during pixel readout.

BRIEF SUMMARY OF THE INVENTION

Embodiments of the present invention provide novel technical solutions for reading out pixels of an image sensor with reduced dark current. Exemplary embodiments of the inventive concept utilize novel pixel clustering schemes. The inventive concept is relevant in image sensors where multiple photodiodes shared a same readout structure.

In one aspect of the present invention, an image sensor may include a controller and a plurality of pixel clusters. Each of the pixel clusters includes a plurality of pixels coupled to a reset transistor, a floating diffusion node, a source follower, and a select transistor coupled to a select signal. In one embodiment, each pixel of a pixel cluster includes a photodiode and a transfer transistor having a first terminal coupled to the photodiode, a second terminal coupled to the floating diffusion node, and a gate. In one embodiment, the controller is configured to apply a transfer control signal to the gate of the transfer transistor in response to a pixel operation phase, the transfer control signal having one of a positive voltage level, a negative voltage level, and a ground voltage level. The controller is configured to continuously apply a negative voltage level to the transfer transistors and a ground voltage level to the reset transistor and the select transistor during the exposure interval. The controller is also configured to alternately apply positive voltage levels and ground voltage levels to the reset transistor and the transfer transistors to load the floating diffusion node with electric signals associated with VDD-RST and pixel signals with each of the pixels and transfer the electrical signals and the pixel signals to the ADC through the readout line for data conversion and data storage.

In one embodiment, the image sensor also includes a buffer circuit configured to apply the positive voltage level, the negative voltage level, and the ground voltage level to the transfer control signal.

In another aspect of the present invention, a method of operating a pixel cluster of an image sensor is provided, the pixel cluster includes a plurality of pixels coupled to a reset transistor, a floating diffusion node, a source follower, and a select transistor. The method may include providing a plurality of voltages having a positive voltage level, a ground voltage level, and a negative voltage level, applying the negative voltage level to the gate of each of the transfer transistors coupled to respective photodiodes during an exposure interval of the pixels, and alternately applying the positive voltage level and the ground voltage level to the reset transistor and the transfer transistors during a readout interval while continuously applying a positive voltage level to the select transistor.

By applying a negative voltage (below the ground voltage) to the transfer transistors during the entire exposure interval, dark current can be avoided and noise coupling through the transfer control signals during the pixel readout operation can be reduced.

Additional features and advantages will be apparent to those skilled in the art upon reading the following detailed description and the accompanying drawings.

BRIEF DESCRIPTION OF THE DRAWINGS

The accompanying drawings form a part of the present disclosure that describe exemplary embodiments of the present invention. The drawings together with the specification will explain the principles of the invention.

DETAILED DESCRIPTION OF THE INVENTION

The main reason that the transfer gate control signal (TX) is driven below 0V is to reduce dark current in the pixel. Dark current refers to electrons which accumulate at a certain rate over time in the pixel but are not related to photons hitting the pixel. The current level refers to the rate at which they accumulate. The electrons are mainly accumulated in the pixel photodiode during the exposure time, which is relatively long compared to the readout time. Due to the physics of the photodiode and the channel under the transfer gate, in some pixel designs the dark current can be significantly reduced by driving the TX voltage lower than ground. In an example configuration, the pixel readout time might be 3 µs while the exposure is 30 ms. In an extreme low light configuration, the exposure may even be as long as 100 ms or 300 ms. There may be much shorter exposures in bright light scenarios, but the short exposure itself normally insures that the dark current will not be a significant impairment in the pixel readout operation.

An inventive concept of the present invention is to change the TX low voltage being driven to the pixel during pixel readout for just the pixel row that is being readout. In this way, the benefit of driving the TX signal below ground for nearly the entire exposure time can be obtained, and noise coupling through the TX signal during the pixel readout operation can also be avoided. The dark current may be 10 or 100× larger when TX is driven to ground, but since the pixel readout time is typically less than 1/1000 the duration of the exposure time for cases where the dark current level is of interest.

The inventive concept also provides an additional benefit since smear is another factor in image quality metrics which is related to a large shift in the average readout value of other pixels in the row can impact the particular value of an individual pixel in the row. This can be caused by coupling from many pixels in the row to a shared control line causing the voltage on this line to change and then coupling to individual pixels causing small changes on each individual pixel readout result. By connecting the TX line to ground during the pixel readout operation, its sensitivity to coupling from pixels is significantly reduced.

The basic readout operation of a column parallel image readout sensor with a shared row-based control is to first select the pixel row to be read out. Then the reset control signal (RST) is toggled to drive a reset voltage on the floating diffusion associated with the pixel. The voltage on the floating diffusion node is driven onto a shared column output line by a source follower transistor through the select transistor, which has been turned on by the select signal being driven high. After a certain time for settling of the pixel and output line, an analog-to-digital (ADC) conversion is performed on this voltage. Then the TX signal is toggled to transfer charge from the photodiode to the floating diffusion node. After settling again, the new output voltage is measured by the column ADC and the pixel output result is taken as the difference of the two ADC conversions. In some cases, multiple ADC conversions may be performed after both RST and TX toggling, or an analog sampling concept may be introduced at the column output either with the same number of ADC conversions, or just one ADC conversion, if the analog sampling is used to produce a differential analog signal. In either case, the readout result is sensitive to noise coupling in the pixel during either the ADC conversion or the analog sampling moment, neither of which happen while TX line is high, but either before or after it toggles. In this case, we can change the low drive level on the TX signal for the row that is selected and drive it to ground instead of 0. This way the noise of the below ground TX low level cannot couple to the pixel during read operation.

In many image sensors, multiple pixels shared the same reset, source follower and select transistors, though each photodiode must have its own transfer gate to function as an independent photodiode. It may be 2, 4, 8 or other numbers of pixels that shared the same reset, source follower and select transistors. In this situation it is usually the case that the TX control lines for all the pixels can contribute equally in noise to the readout of other pixels in the same sharing group. To gain the benefit of the proposed scheme, the low level control of all the TX control lines must be switched or connected to ground when any of the pixels in the shared structure are being read out. This will proportionally increase the duration of time that a TX signal is driven to ground instead of a below ground level during the exposure time. However, since the number of shared pixels is not exceptionally large, it is expected that the impact to dark current will be negligible in most exposure time scenarios that matter for most pixel designs.

As described, the simplest control signal is to change the TX low level for a selected row to ground during the time that row is selected. To get the benefit of this scheme, it is only necessary to drive the low level to ground during the moment that the column output is being sampled by the ADC or analog sampling is occurring at the column output. The present proposal includes any scenarios where the TX low level is driven to ground for a period of time around the pixel readout operation for the purpose of removing shared coupled noise from the below ground TX low level for durations both greater than and less than the exact row select time.

One potential disadvantage of this scheme is that if the TX low voltage is being used to generate greater storage capacity in the photodiode, this benefit may be lost while employing this scheme. However, most pixel designs the storage capacity of the photodiode (also known as full well capacity—FWC) is only weakly dependent on the TX low voltage.

Figure 1:
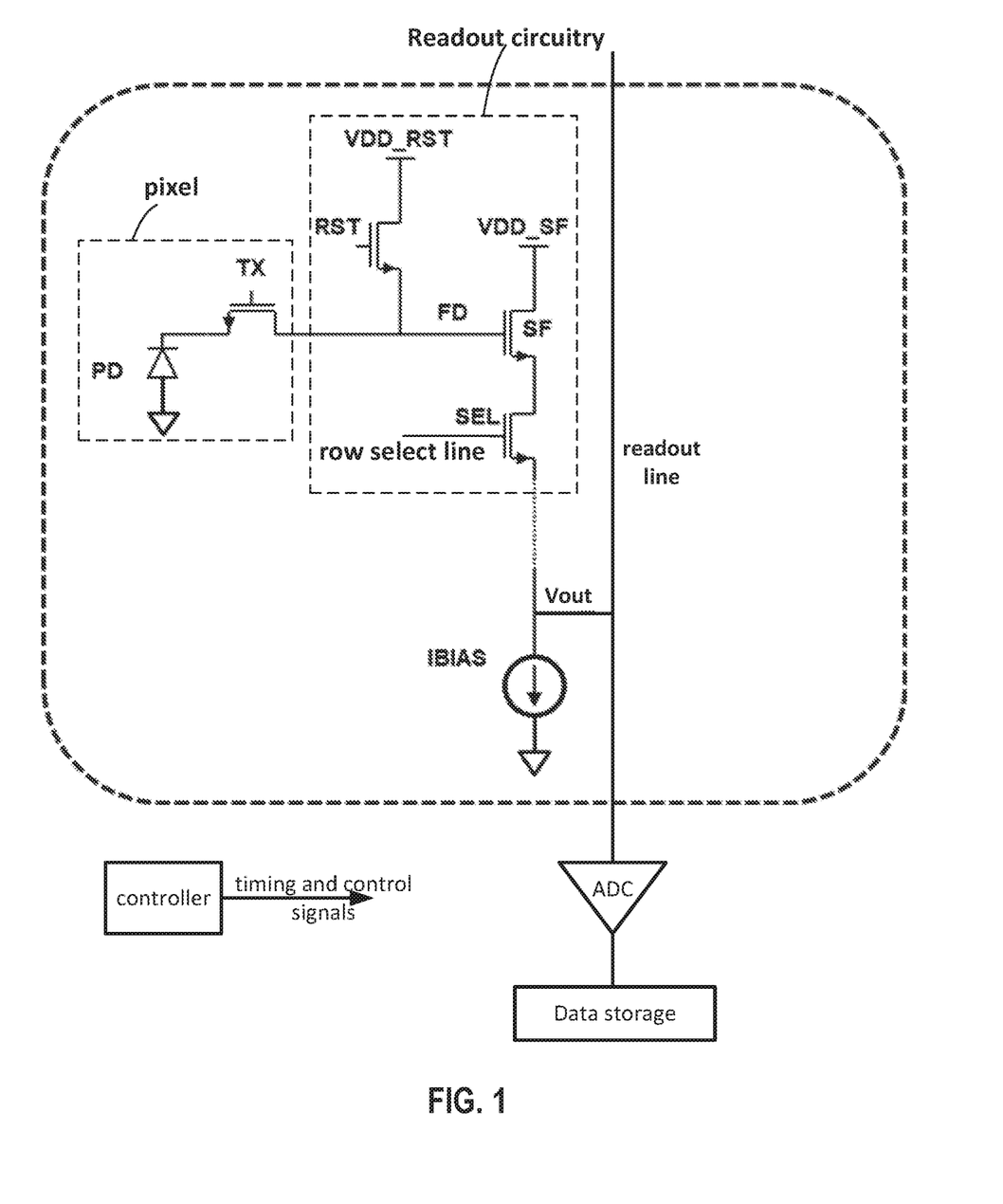
FIG. 1 is a schematic diagram illustrating a portion of an image sensor including a pixel and readout circuitry that may be used to explain the present disclosure.

FIG. 1 is a schematic diagram illustrating a portion of an image sensor including a pixel and readout circuitry that may be used to explain the present disclosure. Referring to FIG. 1, the pixel includes a photodiode (or a photosensitive element) PD, and a transfer transistor TX coupled to the photodiode PD. The readout circuitry includes a source follower SF having a gate coupled to the transfer transistor TX, a reset transistor RST coupled to a floating diffusion node FD disposed between the transfer transistor TX and the gate of the source follower SF. The reset transistor RST is configured to charge the floating diffusion node FD to the reset voltage VDD_RST when the reset transistor RST is turned on, thereby resetting the floating diffusion node FD. The photodiode PD may be reset along with the floating diffusion node FD by turning on the transfer transistor TX. The source follower SF has a terminal coupled to the source follower voltage VDD_SF and another terminal coupled to a select transistor SEL. The select transistor SEL has a gate coupled to a row select line for receiving a select signal. The select transistor SEL is disposed between the source follower SF and a voltage readout line that provides an analog output pixel signal VOUT to an analog-to-digital converter ADC. The select transistor SEL is coupled to a current source IBIAS. The analog output pixel signal VOUT is connected to the readout line and provided to an ADC for data conversion. In one embodiment, the transfer transistor TX, the reset transistor RST, the source follower SF, and the select transistor SEL are NMOS transistors. The image sensor may also include a controller configured to provide clock timing and control signals for the pixel, the readout circuitry, and the ADC. The image sensor may also include a data storage configured to store digital data representative of the pixel signals.

Figure 2:
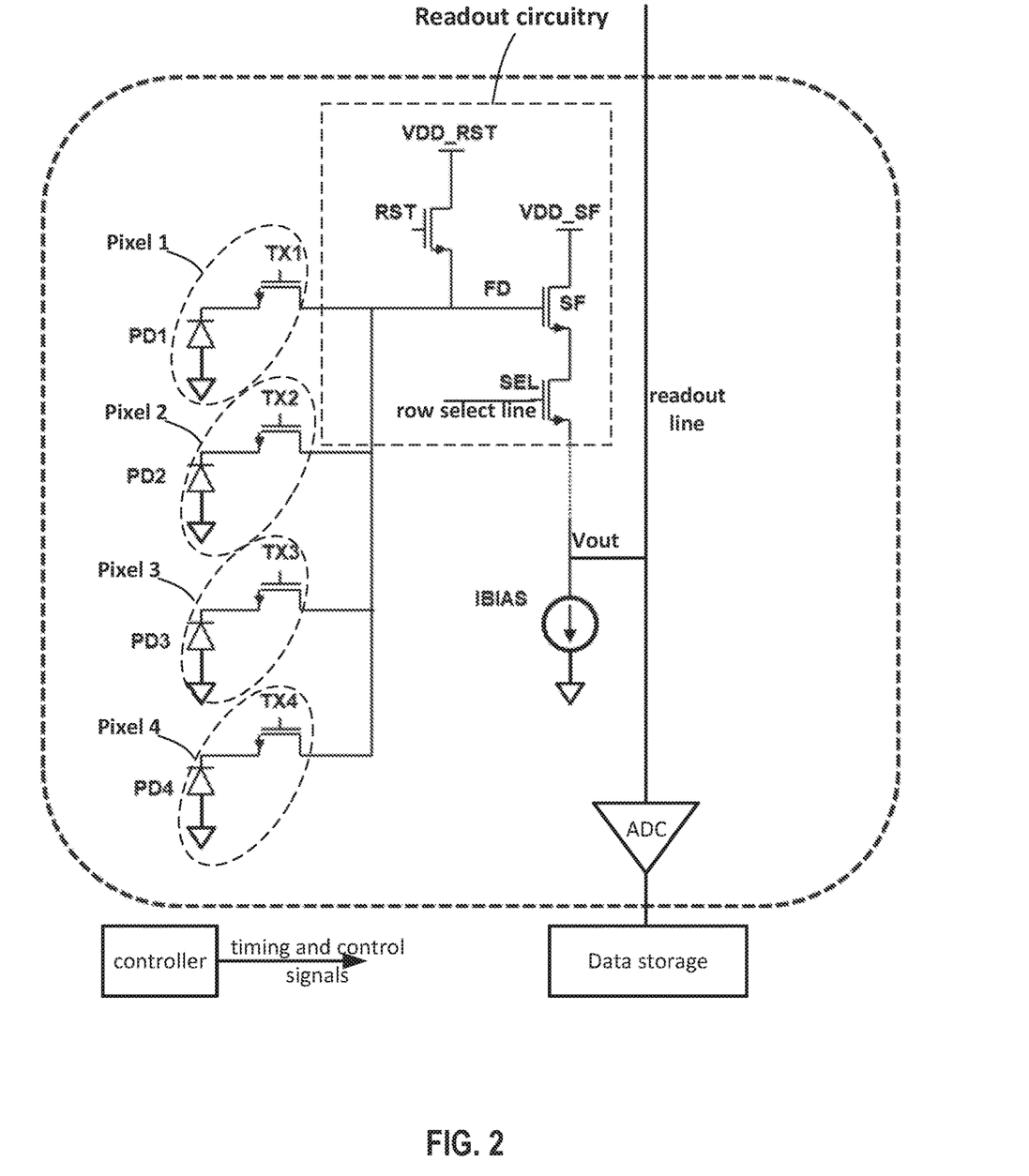
FIG. 2 is a schematic diagram illustrating a portion of an image sensor including four pixels and readout circuitry according to an embodiment of the present disclosure.

FIG. 2 is a schematic diagram illustrating a portion of an image sensor including four pixels and readout circuitry according to an embodiment of the present disclosure. Referring to FIG. 2, four pixels (pixel 1, pixel 2, pixel 3, and pixel 4) in four different rows or in four different columns share a same floating diffusion node FD, a reset transistor RST, a source follower transistor SF, and a select transistor SEL. The pixel on each row or each column has its own transfer transistor TX. In one embodiment, the four pixels are grouped in a pixel cluster, and a charge of each of the four pixels can be transferred individually and sequentially to the floating diffusion node FD by activating respective transfer transistors TX1 through TX4. The charge level of floating diffusion node FD can be provided to the readout line and to the ADC for data conversion to obtain digital data, which is then stored in a data storage. A controller is configured to provide timing, clock, and control signals to the transfer transistors, the readout circuitry, and the ADC for data conversion and data storage. In one embodiment, the controller may include processing circuitry, logic state machines, phase locked loops, and the like to provide timing, clock and control signals to the image sensor. It is noted that the number of pixels in a pixel cluster can be any integer number. In the example shown in FIG. 2, four pixels are used, but it is understood that the number is arbitrary chosen for describing the example embodiment and should not be limiting.

Figure 3:
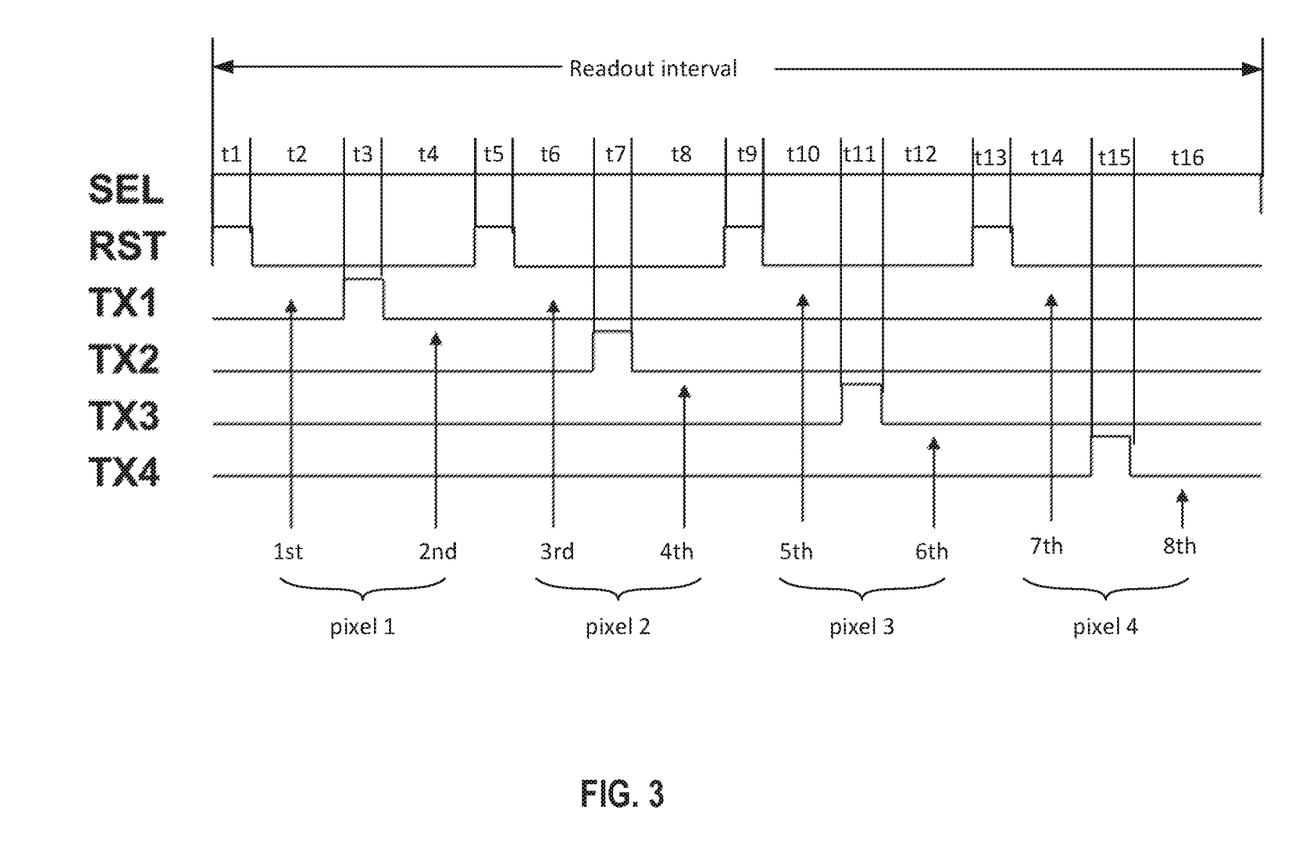
FIG. 3 is a timing diagram illustrating a readout cycle for reading out individual pixels of FIG. 2.

FIG. 3 is a timing diagram illustrating a readout cycle for reading out individual pixels of FIG. 2. Referring to FIGS. 2 and 3, pixel signals of pixels 1 through 4 are separately and individually provided to the readout line in a time sequential manner. The SEL signal is asserted high during the entire readout period or readout interval, in which pixel signals of the four pixels (pixel 1, pixel 2, pixel 3, and pixel 4) are sequentially read out and provided to the ADC through the readout line for data conversion. The reset control signal RST at time interval t1 is asserted high (to a positive voltage level higher than a ground level) to activate (turn on) the reset transistor RST, which resets the floating diffusion node FD to the VDD_RST level. The ADC performs a first data conversion to obtain a first data code corresponding to a charge of the floating diffusion node FD in the reset phase at time period t2. The first data code is stored in the data storage. Thereafter, a transfer control signal TX1 is asserted high to allow a pixel signal (charges accumulated in photodiode PD1) of pixel 1 to be transferred to the floating diffusion node FD at time interval t3. The ADC performs a second data conversion to obtain a second data corresponding to the pixel signal of pixel 1 at time interval t4. The second data code is stored in the data storage. The difference between the first and the second data codes represents the effective charge or pixel signal. The digital correlated double sampling thus eliminates noise and gain offset in the analog-to-digital conversion.

Subsequently, the reset control signal RST is asserted high at time interval t5 to activate the reset transistor RST, and the floating diffusion node FD is reset to the VDD_RST level. The ADC performs a third data conversion to obtain a third data code at time period t6. The third data code is stored in the data storage. Thereafter, a transfer control signal TX2 is asserted high to allow a pixel signal (charges accumulated in photodiode PD2) of pixel 2 to be transferred to the floating diffusion node FD at time interval t7. The ADC performs a fourth data conversion to obtain a fourth data code corresponding to the pixel signal of pixel 2 at time interval t8. The fourth data code is stored in the data storage.

Subsequently, the reset control signal RST is asserted high at time interval t9 to activate the reset transistor RST, and the floating diffusion node FD is reset to the VDD_RST level. The ADC performs a fifth data conversion to obtain a fifth data code at time period t10, and the fifth data code is stored in the data storage. Thereafter, a transfer control signal TX3 is asserted high to allow a pixel signal (charges accumulated in photodiode PD3) of pixel 3 to be transferred to the floating diffusion node FD at time interval t11. The ADC performs a sixth data conversion to obtain a sixth data code corresponding to the pixel signal of pixel 3 at time interval t12, and the sixth data code is stored in the data storage.

Subsequently, the reset control signal RST is asserted high at time interval t13 to activate the reset transistor RST, and the floating diffusion node FD is reset to the VDD_RST level. The ADC performs a seventh data conversion to obtain a seventh data code at time period t14, and the seventh data code is stored in the data storage. Thereafter, a transfer control signal TX4 is asserted high to allow a pixel signal (charges accumulated in photodiode PD4) of pixel 4 to be transferred to the floating diffusion node FD at time interval t15. The ADC performs an eighth data conversion to obtain an eighth data code corresponding to the pixel signal of pixel 4 at time interval t16, and the eighth data code is stored in the data storage. It is noted that the controller may provide the timing and control signals to the pixels, readout circuitry, the ADC and the data storage. It is noted that the number of pixels in the readout period can be any integer number. In the example shown in FIGS. 2 and 3, four pixels are used, but it is understood that the number is arbitrarily chosen for describing the example embodiment and should not be limiting.

Figure 4:
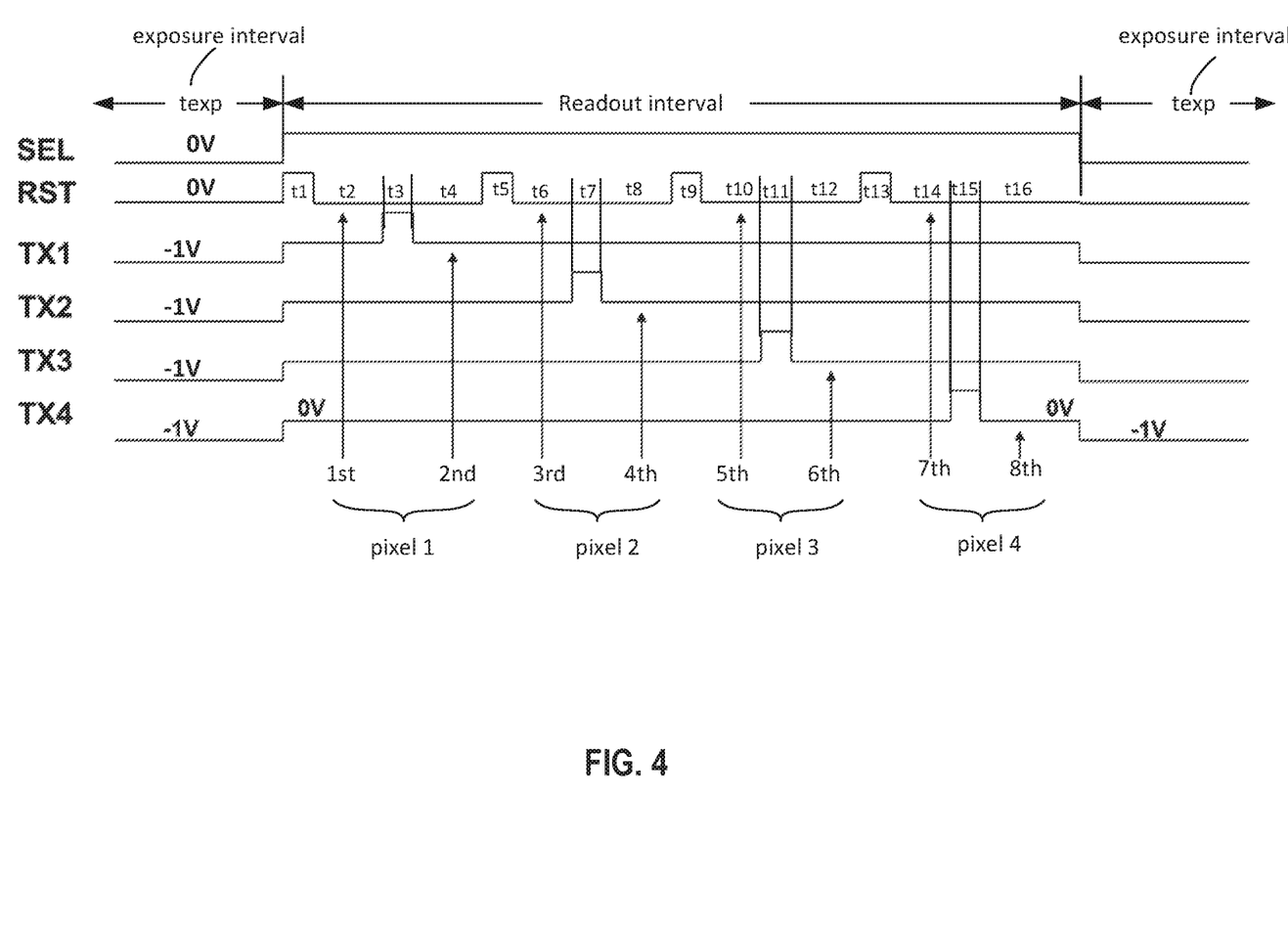
FIG. 4 is a timing diagram illustrating an exposure and readout cycle for photons accumulation and reading out individual pixels of FIG. 2 according to an embodiment of the present disclosure.

FIG. 4 is an operation timing diagram illustrating an exposure and readout cycle for photons accumulation and reading out individual pixels of FIG. 2 according to an embodiment of the present disclosure. Referring to FIGS. 2 and 4, at an exposure time interval texp, i.e., at the non-selection time interval where the SEL transistor and the RST transistor are deactivated (turned off), the SEL signal and the reset control signal each are asserted to a ground potential (e.g., 0V), photodiodes PD1, PD2, PD3, PD3 of the respective pixel 1, pixel 2, pixel 3, and pixel 4 accumulate photons based on incident light. As explained above, the exposure interval is significantly longer than the readout interval. During the charge accumulation interval, electrons that are not related to photons hitting the pixel form under the channel of the gate of the transfer transistor. According to the inventive concept, a negative voltage level is applied to the gate of the transfer transistors TX1, TX2, TX3, TX4. The negative voltage level attracts holes to the channel, and the holes recombine with the electrons under the gate so that the dark current can be eliminated. In one embodiment, the negative voltage level can be in the range between −0.5V to −1.3V, e.g., −0.9V, −1.0V, or −1.1V.

Referring still to FIG. 4, during the readout interval, the SEL signal is asserted high (e.g., in a range between 1.8V to 3.3V), the reset control signal RST is asserted high at time interval t1 to activate the reset transistor RST, which resets the floating diffusion node FD to the VDD_RST level (e.g., in a range between 1.8V to 3.3V). During the time interval t2, the ADC performs a first data conversion to obtain a first data code, which is stored in the data storage. Subsequently, at time interval t3, the TX1 signal is asserted high (e.g., a positive voltage level in a range between 1.8V to 3.3V) to activate transfer transistor TX1. A pixel signal (charges accumulated in photodiode PD1) of pixel 1 is transferred to the floating diffusion node FD at time interval t3. The ADC performs a second data conversion to obtain a second data code corresponding to the pixel signal of pixel 1 at time interval t4, and the second data code is stored in the data storage for further processing. The pixel signal readout operations of pixel 2, pixel 3, and pixel 4 are subsequently performed. The readout operations have been described in detail with reference to FIG. 3 and will not repeat herein for the sake of brevity.

Figure 5A:
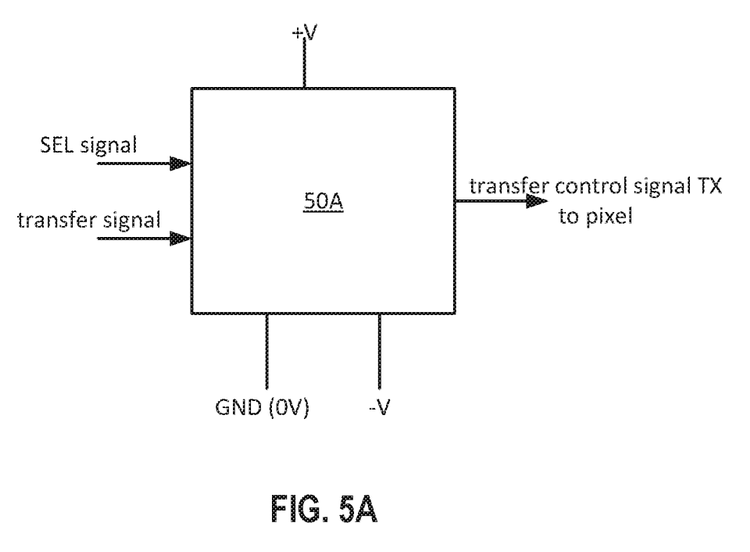
FIG. 5A is a simplified block diagram illustrating a buffer circuit for generating a transfer control signal TX to a pixel according to an embodiment of the present disclosure.

FIG. 5A is a simplified block diagram illustrating a buffer circuit 50A for generating a transfer control signal TX to a pixel according to an embodiment of the present disclosure. Referring to FIG. 5A, buffer circuit 50A includes a positive voltage terminal for receiving a positive voltage (+V), a ground terminal for receiving a ground voltage (0V), and a negative voltage terminal for receiving a negative voltage (−V). Buffer circuit 50A also includes a first input for receiving a select signal SEL, a second input for receiving a pixel transfer signal (denoted transfer signal), and an output for outputting a transfer control signal TX to a pixel. In one embodiment, the SEL signal and the transfer signal may be provided by the controller shown in FIG. 2. In one embodiment, buffer circuit 50A is located in the controller. In one embodiment, buffer circuit 50A is disposed separately from the controller.

Figure 5B:
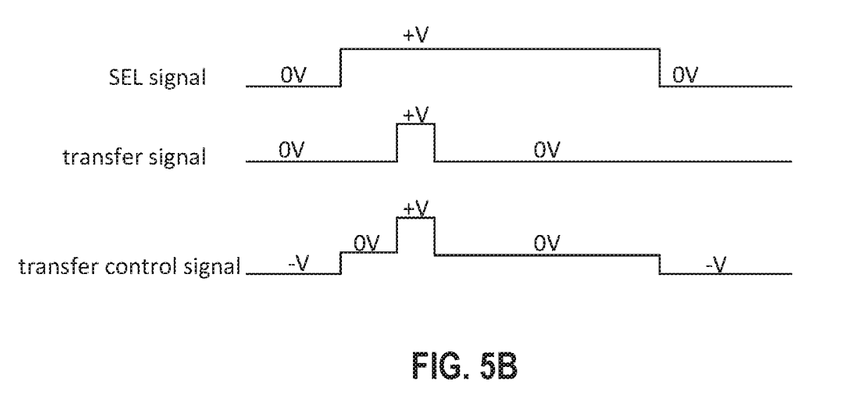
FIG. 5B is a timing diagram illustrating an operation of the buffer circuit of FIG. 5A.

FIG. 5B is a timing diagram illustrating an operation of the buffer circuit 50A. When the SEL signal and the pixel transfer signal are asserted low (0V), the transfer control signal at the output of buffer circuit 50A has a negative voltage level (−V). When the SEL signal is asserted high (+V) and the pixel transfer signal is asserted low, the transfer control signal at the output of buffer circuit 50A has a ground voltage level (0V). When the SEL signal and the pixel transfer signal are asserted high, the transfer control signal at the output of buffer circuit 50A has a positive voltage level.

Figure 5C:
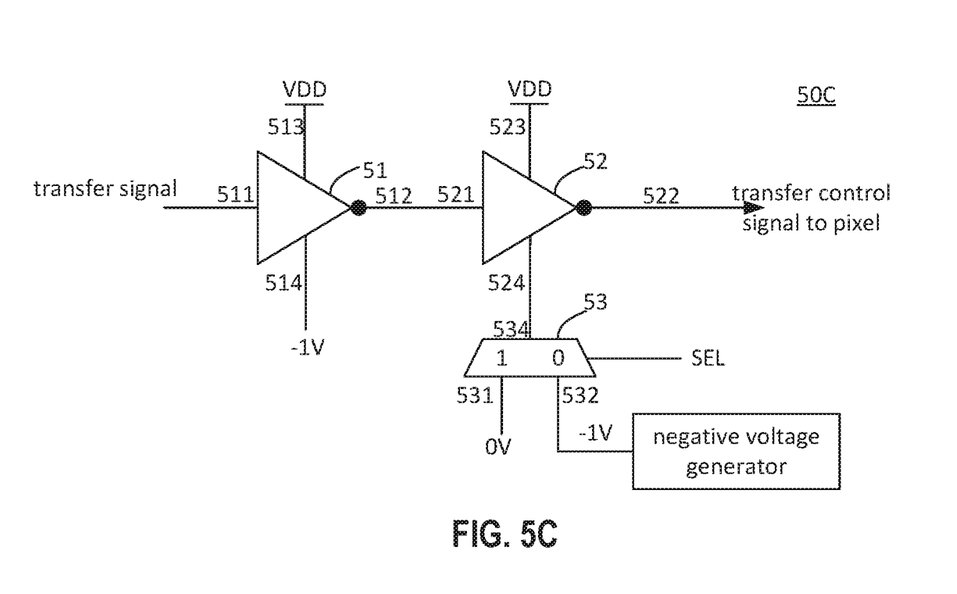
FIG. 5C is a circuit block diagram illustrating a buffer circuit for generating a plurality of voltage levels including positive voltage levels, negative voltage levels and ground voltage levels according to an embodiment of the present disclosure.

FIG. 5C is a circuit block diagram illustrating a buffer circuit 50C for generating a plurality of voltages including a positive voltage, a negative voltage, and a ground voltage (ground potential) according to an embodiment of the present disclosure. Referring to FIG. 5C, buffer circuit 50C includes a first inverter 51, a second inverter 52, and a multiplexer 53. In one embodiment, first inverter 51 includes an input 511, an output 512, a first supply terminal 513 coupled to a positive voltage supply VDD, and a second supply terminal 514 coupled to a negative voltage. Second inverter 52 includes an input 521 coupled to output 512 of first inverter 51, an output 522 configured to provide a voltage signal including a plurality of voltage levels including a positive voltage level, a negative voltage level, and a ground voltage level to a pixel, a first supply terminal 523 coupled to the positive voltage supply VDD, and a second supply terminal 524 coupled to an output 534 of multiplexer 53. Multiplexer 53 is an analog multiplexer having a first input 531 coupled to the ground voltage (0V), a second input 532 coupled to the negative voltage (−1V), a third input 533 for receiving the SEL signal, and an output 534 configured to provide one of the ground voltage (e.g., 0V) and the negative voltage (e.g., −1.0V) in response to the SEL signal. In one embodiment, the voltage level at the output 522 of second inverter 52 is a positive voltage level when the transfer signal at input 511 of first inverter 51 is a positive level (logic high) and the SEL signal is asserted high (e.g., VDD). In one embodiment, the voltage level at the output 522 of second inverter 52 is a negative voltage level when the transfer signal at input 511 of first inverter 51 is a positive level and the SEL signal is asserted low (e.g., GND). In one embodiment, the voltage level at the output 522 of second inverter 52 is a ground voltage level when the transfer signal at input 511 of first inverter 51 is a ground level and the SEL signal is asserted high (e.g., VDD). In one embodiment, the negative voltage is provided by a negative voltage generator. In one embodiment, the negative voltage generator is located in the image sensor. In one embodiment, the negative voltage generator is located external to the image sensor.

Figure 5D:
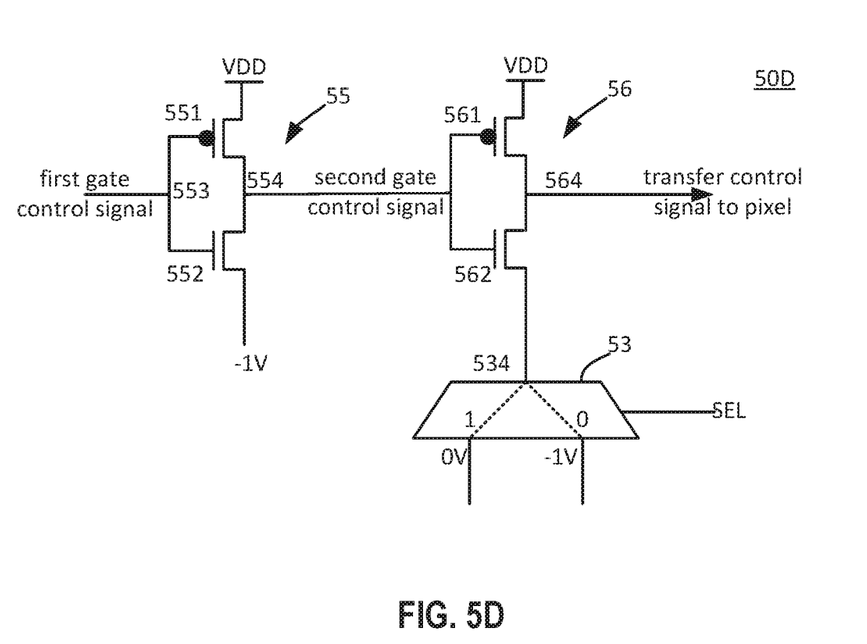
FIG. 5D is a circuit block diagram illustrating a buffer circuit for generating a plurality of voltage levels including positive voltage levels, negative voltage levels and ground voltage levels according to an embodiment of the present disclosure.

FIG. 5D is a circuit block diagram illustrating a buffer circuit 50D for generating a plurality of voltages including a positive voltage, a negative voltage, and a ground voltage according to an embodiment of the present disclosure. Referring to FIG. 5D, buffer circuit 50D includes a first CMOS inverter 55, a second CMOS inverter 56, and a multiplexer 53. First CMOS inverter 55 includes series-connected PMOS transistor 551 and NMOS transistor 552 arranged between the positive supply voltage VDD and a negative voltage (e.g., −1V). First CMOS inverter 55 has an input 553 configured to receive a first gate control signal and generate a second gate control signal at its output 554. The second gate control signal is complementary to the first gate control signal. In other words, the first and second gate control signals have opposite phases or have opposite polarity, e.g., if the first gate control signal is at the ground potential (0V), the second gate control signal is at VDD, and vice versa. Second CMOS inverter 56 has a PMOS transistor 561 and an NMOS transistor 562 connected in series between the power supply VDD and the output 534 of multiplexer 53. Second CMOS inverter 56 has an input 563 coupled to output 554 of first CMOS inverter, and an output 564 configured to provide a transfer control signal having one of a positive voltage level, a negative voltage level, and a ground voltage level to the gate of a transfer transistor TX associated with a pixel.

In one embodiment, the voltage level at output 564 of second CMOS inverter 56 is a positive voltage level when the first gate control signal at input 553 of first CMOS inverter 55 is a positive level and the SEL signal is asserted high (e.g., VDD). In one embodiment, the voltage level at output 564 of second CMOS inverter 56 is a negative voltage level when the first gate control signal at input 553 of first CMOS inverter 55 is a positive level and the SEL signal is asserted low (e.g., GND). In one embodiment, the voltage level at output 564 of second CMOS inverter 56 is a ground voltage level when the first gate control signal at input 553 of first CMOS inverter 55 is a ground level and the SEL signal is asserted high (e.g., VDD).

Figure 6:
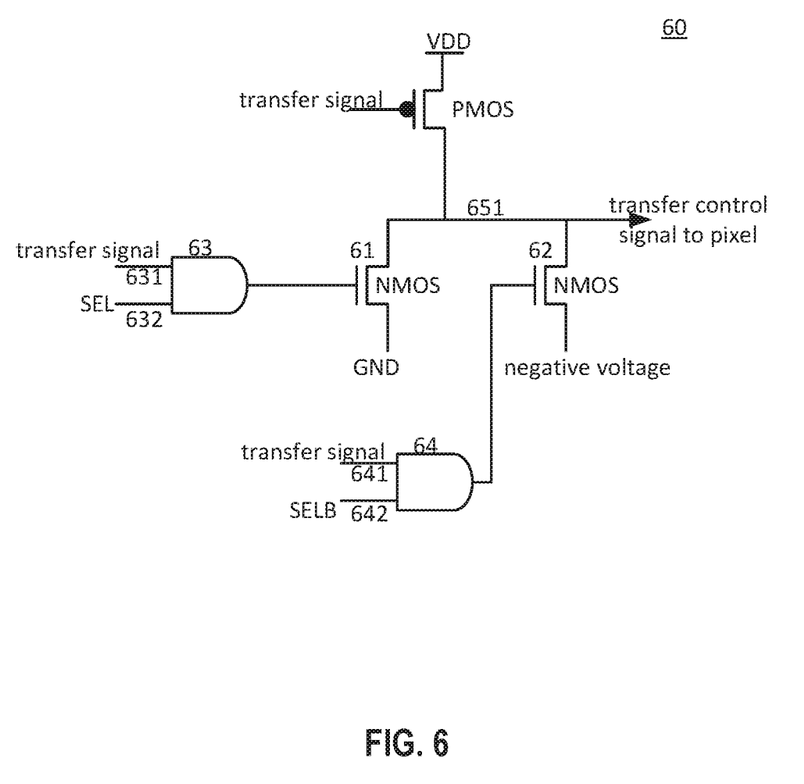
FIG. 6 is a circuit block diagram illustrating a buffer circuit for generating a plurality of voltage levels including positive voltage levels, negative voltage levels and ground voltage levels according to an embodiment of the present disclosure.

FIG. 6 is a circuit block diagram illustrating a buffer circuit 60 for generating a plurality of voltage levels including positive voltage levels, negative voltage levels and ground voltage levels according to an embodiment of the present disclosure. Referring to FIG. 6, buffer circuit 60 includes a PMOS transistor having a source coupled to a positive voltage supply VDD, a drain, and a gate configured to receive a transfer signal, a first NMOS transistor 61 having a drain coupled to the drain of the PMOS transistor, a source coupled to a ground potential GND, and a gate coupled to an output of a first logic gate 63. Buffer circuit 60 also includes a second NMOS transistor 62 having a drain coupled to the drain of the PMOS transistor, a source coupled to a negative voltage, and a gate coupled to an output of a second logic gate 64. First logic gate 63 has a first input 631 configured to receive the transfer signal and a second input 632 configured to receive a SEL signal. Second logic gate 64 has a first input 641 configured to receive the transfer signal and a second input 642 configured to receive a second SELB signal complementary to the SEL signal, i.e., SEL and SELB signal have opposite phases.

In one embodiment, the PMOS transistor is configured to provide the positive voltage level in response to the transfer signal, the first NMOS transistor is configured to provide the ground voltage level in response to a logic state of the first output of the first logic gate, and the second NMOS transistor is configured to provide the negative voltage level in response to a logic state of the second output of the second logic gate.

In one embodiment, the voltage at output 651 of buffer circuit 60 is a positive voltage when the transfer signal at the gate of the PMOS transistor has a ground voltage level. In one embodiment, the voltage at output 651 of buffer circuit 60 has a negative voltage level when the transfer signal at the gate of the PMOS transistor is a positive voltage (logic high) and the SEL signal is asserted low (e.g., GND). In one embodiment, the voltage at output 651 of buffer circuit 60 has a ground voltage level when the transfer signal at the gate of the PMOS transistor is a positive voltage and the SEL signal is asserted high (e.g., VDD).

Figure 7:
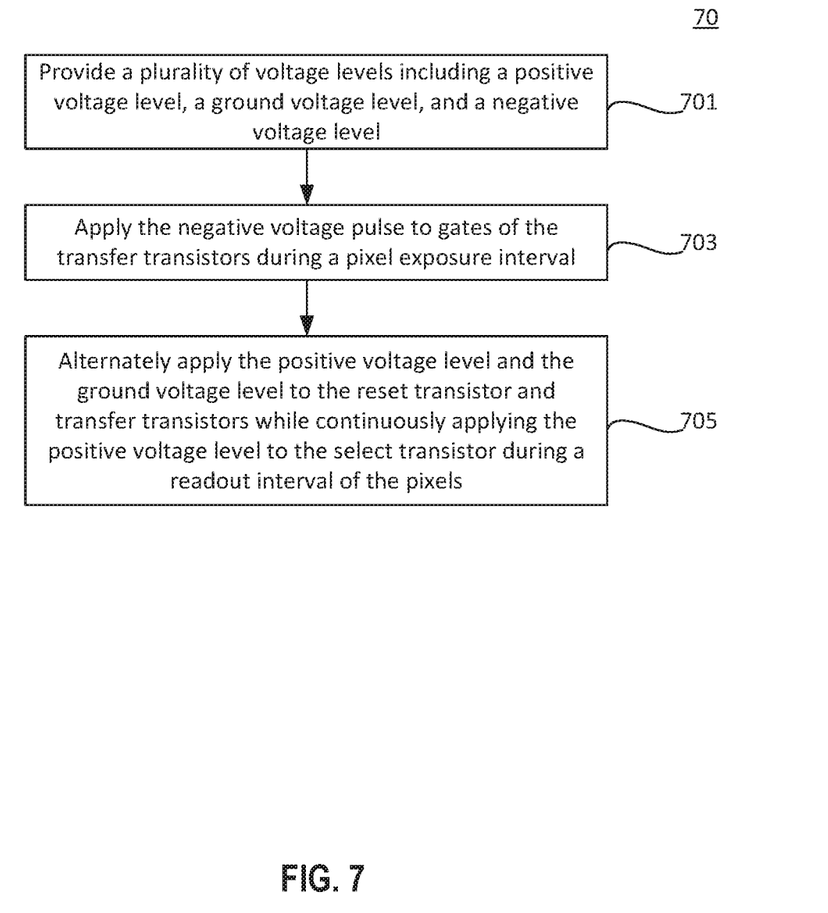
FIG. 7 is a simplified flowchart illustrating a method of operating a pixel cluster of an image sensor according to an embodiment of the present disclosure.

FIG. 7 is a simplified flowchart illustrating a method 70 of reading out a pixel cluster of an image sensor according to an embodiment of the present disclosure. Referring to FIG. 7, method 70 includes providing a plurality of voltage levels including a positive voltage level, a ground voltage level, and a negative voltage level in block 701. In one embodiment, the positive voltage level, the ground voltage level, and the negative voltage level can be generated by buffer circuit 50A, 50C, 50D, and 60 as shown in FIGS. 5A, 5C, 5D, and 6, respectively. In block 703, method 70 includes applying a negative voltage level to the gate of each of the transfer transistors coupled to respective photodiodes during an exposure time interval or exposure interval of the pixels. Referring to FIG. 4, a negative voltage level is applied to the gate of the transfer transistors. In one embodiment, the SEL signal and the reset control signal RST are continuously asserted to the ground voltage (0V) to turn off (deactivate) the select transistor and the select transistor while the negative voltage level is continuously applied to the gate of each of the transfer transistors. In block 705, method 70 includes alternately applying the positive voltage level and the ground voltage level to the reset transistor and the transfer transistors during a readout interval while the SEL signal is continuously asserted high (e.g., VDD). Referring to FIGS. 2, 3, and 4, the reset transistor RST and each of the transfer transistors are alternately activated (turned on) to alternately load the floating diffusion node with an electric signal VDD_RST and pixel signals and provide the electric signal and the pixel signals to the readout line for data conversion and data storage.

Embodiments present disclosure provide an image sensor. The image sensor may include a controller and a plurality of pixel clusters. Each of the pixel clusters includes a plurality of pixels coupled to a reset transistor, a floating diffusion node, a source follower, and a select transistor coupled to a select signal. Referring to FIG. 2, a pixel cluster includes four pixels, and each pixel include a photodiode and a transfer transistor having a first terminal coupled to the photodiode, a second terminal coupled to the floating diffusion node, and a gate. The controller is configured to apply a first transfer control signal to the gate of the transfer transistor in response to a pixel operation phase, the first transfer control signal being one of a positive voltage level, a negative voltage level, and a ground voltage level. Referring to FIG. 4, the controller is configured to continuously apply a negative voltage level to the transfer transistors and a ground voltage level to the reset transistor and the select transistor during the exposure interval. The controller is also configured to alternately apply positive voltage levels and ground voltage levels to the reset transistor and the transfer transistors to load the floating diffusion node with electric signals associated with VDD-RST and pixel signals with each of the pixels and transfer the electrical signals and the pixel signals to the ADC through the readout line for data conversion and data storage.

In one embodiment, the image sensor may include a buffer circuit configured to generate the positive voltage level, the negative voltage level, and the ground voltage level, as shown in FIGS. 5A through 5D, and 6.

The above description of illustrated embodiments is not intended to be exhaustive. While the inventive concepts are described herein for illustrative purpose, various modifications are possible within the scope of the invention.

What is claimed is:

1. An image sensor comprising:
   a controller;
   a plurality of pixel clusters, each of the pixel clusters comprising a plurality of pixels coupled to a reset transistor, a floating diffusion node, a source follower, and a select transistor coupled to a select signal, each pixel of a pixel cluster comprising:
      a photodiode; and
      a transfer transistor having a first terminal coupled to the photodiode, a second terminal coupled to the floating diffusion node, and a gate; and
   a buffer circuit comprising:
      a multiplexer having a first input to receive a ground voltage level, a second input coupled to a negative terminal to receive a negative voltage level, a third input coupled to the select signal, and a multiplexer output to output a selected one of the ground level or the negative voltage level based on the select signal;
      a first CMOS inverter coupled to a positive voltage terminal to receive a positive voltage level and to the negative voltage terminal, and configured to generate a first CMOS output responsive to receiving a transfer signal; and
      a second CMOS inverter coupled to the positive voltage terminal and the multiplexer output, and configured to generate a transfer control signal responsive to receiving the first CMOS output,
   wherein the controller is configured to apply the transfer control signal to the gate of the transfer transistor in response to a pixel operation, such that the transfer control signal has one of the positive voltage level, the negative voltage level, or the ground voltage level.

2. The image sensor of claim 1, wherein the controller is configured to apply the positive voltage level to the gate of the transfer transistor during a pixel charge transfer interval, the ground voltage level in a pixel reset interval, and the negative voltage level during a pixel exposure interval.

3. The image sensor of claim 1, wherein the controller is configured to apply the negative voltage level to the gate of the transfer transistor of each pixel in a pixel cluster during a time interval when the select transistor is turned off, and alternately apply the positive voltage level and the ground voltage level to turn on and off the reset transistor for reading out first charge signals in the floating diffusion node and for converting the first charge signals to first digital data of each pixel in the pixel cluster during a time interval when the select transistor is turned on.

4. The image sensor of claim 3, wherein the controller is further configured to alternately apply the positive voltage level and the ground voltage level to turn on and off the transfer transistor for reading out second charge signals in the floating diffusion node and for converting the second charge signals to second digital data of each pixel in the pixel cluster during the time interval when the select transistor is turned on and the reset transistor is turned off.

5. An image sensor comprising:
a pixel cluster having a plurality of pixels sharing a reset transistor, a floating diffusion node, a source follower, and a select transistor coupled to a select signal, each pixel of the pixel cluster comprising:
a photodiode; and
a transfer transistor having a first terminal coupled to the photodiode, a second terminal coupled to the floating diffusion node, and a gate; and
a buffer circuit comprising:
a multiplexer having a first input to receive a ground voltage level, a second input coupled to a negative terminal to receive a negative voltage level, a third input coupled to the select signal, and a multiplexer output to output a selected one of the ground level or the negative voltage level based on the select signal;
a first CMOS inverter coupled to a positive voltage terminal for receiving a positive voltage and to the negative voltage terminal, and configured to generate a first CMOS output responsive to receiving a transfer signal; and
a second CMOS inverter coupled to the positive voltage terminal and to the multiplexer output, and configured to generate a transfer control signal responsive to receiving the first CMOS output,
the buffer circuit configured to provide the transfer control signal to the gate of the transfer transistor, such that the transfer control signal has one of the positive voltage level, the negative voltage level, or the ground voltage level in response to the select signal and the transfer signal.

6. A method of operating a pixel cluster of an image sensor, the pixel cluster comprising a plurality of pixels coupled to a reset transistor, a floating diffusion node, a source follower, and a select transistor coupled to a select signal, each pixel comprising a photodiode and a transfer transistor coupled to the photodiode and configured to transfer a pixel signal to the floating diffusion node, the method comprising:
providing a plurality of voltage levels including a positive voltage level, a ground voltage level, and a negative voltage level, by:
providing a buffer circuit comprising an input coupled to a transfer signal provided by a controller;
providing a multiplexer comprising a first input coupled to the ground voltage level, a second input coupled to the negative voltage level, a third input coupled to the select signal, and an output coupled to the buffer circuit; and
providing the ground voltage level or the negative voltage level to the output of the multiplexer in response to the select signal;
applying the negative voltage level to the transfer transistors during an exposure interval; and
alternately applying the positive voltage level and the ground voltage level to the reset transistor and to the transfer transistors during a readout interval of the pixels while continuously applying the positive voltage level to the select transistor.

7. The method of claim 6, further comprising:
continuously applying the ground voltage level to the select transistor and the reset transistor during the exposure interval.

8. The method of claim 6, wherein alternately applying the positive voltage level and the ground voltage level to the reset transistor and to the transfer transistors comprises:
alternately providing first charge signals and second charge signals of the pixels to a readout line, the first charge signals corresponding to first charges accumulated in the floating diffusion node during a reset interval and the second charge signals corresponding to second charges accumulated in the floating diffusion node during a charge transfer interval.

9. The method of claim 6, wherein the buffer circuit comprising:
a first CMOS inverter disposed between a positive voltage having the positive voltage level and the negative voltage, the first CMOS inverter comprising an input coupled to the transfer signal, and an output configured to provide a second transfer signal complementary the transfer signal; and
a second CMOS inverter disposed between the positive voltage and the output of the multiplexer and coupled to the first CMOS inverter, the second CMOS inverter comprising an output configured to provide the plurality of voltage levels in response to the select signal and the transfer signal.

10. The method of claim 9, wherein the second CMOS inverter comprises:
a PMOS transistor having a source coupled to the positive voltage, a drain, and a gate coupled to the transfer signal; and
an NMOS transistor having a source coupled to the drain of the PMOS transistor, a drain coupled to the output of the multiplexer, and a gate coupled to the second transfer signal.

11. The method of claim 6, wherein the buffer circuit is configured to:
provide an output voltage having the positive voltage level when the select signal and the transfer signal are both logic high,
provide the output voltage having the ground voltage level when the select signal is logic high and the transfer signal is logic low, and
provide the output voltage having the negative voltage level when the select signal and the transfer signal are both logic low.

* * * * *